United States Patent
Hayashi (10) Patent No.: US 9,522,574 B2
(45) Date of Patent: Dec. 20, 2016

(54) PNEUMATIC TIRE WITH TREAD HAVING SIPES

(75) Inventor: Koji Hayashi, Kobe (JP)

(73) Assignee: SUMITOMO RUBBER INDUSTRIES, LTD., Kobe-Shi (JP)

( * ) Notice: Subject to any disclaimer, the term of this patent is extended or adjusted under 35 U.S.C. 154(b) by 1304 days.

(21) Appl. No.: 13/430,823

(22) Filed: Mar. 27, 2012

(65) Prior Publication Data

US 2012/0247632 A1 Oct. 4, 2012

(30) Foreign Application Priority Data

Mar. 28, 2011 (JP) ................................ 2011-070574

(51) Int. Cl.
*B60C 11/12* (2006.01)
*B60C 11/13* (2006.01)
*B60C 11/03* (2006.01)

(52) U.S. Cl.
CPC ............ *B60C 11/0306* (2013.04); *B60C 11/12* (2013.01); *B60C 11/0304* (2013.04); *B60C 11/1369* (2013.04); *B60C 2011/0346* (2013.04); *B60C 2011/0365* (2013.04); *B60C 2011/1254* (2013.04)

(58) Field of Classification Search
CPC ............. B60C 11/12; B60C 2011/1254; B60C 11/1369; B60C 11/0304
See application file for complete search history.

(56) References Cited

U.S. PATENT DOCUMENTS

| D586,726 S | * | 2/2009 | Baumard | .................. D12/521 |
| 2005/0103414 | A1* | 5/2005 | Suzuki | .................. B60C 11/12 152/209.5 |

FOREIGN PATENT DOCUMENTS

| DE | 19711607 A1 | * | 12/1997 |
| EP | 788899 A1 | * | 8/1997 |
| JP | 04-201610 A | * | 7/1992 |
| JP | 07-242106 A | * | 9/1995 |
| JP | 2000-225814 A | * | 8/2000 |
| JP | 2001-219718 A | | 8/2001 |

OTHER PUBLICATIONS

Machine translation for Japan 2000-225814 (no date).*
Machine translation for Japan 07-242106 (no date).*
Machine translation for Japan 04-201610 (no date).*
Machine translation for Europe 788,899 (no date).*
Machine translation for German 19711607 (no date).*

* cited by examiner

*Primary Examiner* — Steven D Maki
(74) *Attorney, Agent, or Firm* — Birch, Stewart, Kolasch & Birch, LLP (57) ABSTRACT

A pneumatic tire has a shoulder land zone provided with lateral grooves arranged at variable pitches in the tire circumferential direction and extending at an angle of not more than 30 degrees with respect to the tire axial direction. The domains defined between the shoulder lateral grooves include a smallest domain having the smallest circumferential length and a largest domain having the largest circumferential length. The domains are each provided with at least one sipe extending at an angle of not more than 30 degrees with respect to the tire axial direction. The number of the sipe(s) in the smallest domain is less than the number of the sipes in the largest domain.

8 Claims, 7 Drawing Sheets

PNEUMATIC TIRE WITH TREAD HAVING SIPES

BACKGROUND OF THE INVENTION

The present invention relates to a pneumatic tire, more particularly to a tread pattern capable of improving uneven wear resistance without sacrificing snow/ice performance.

As a technique to reduce tire noise generated by a tread pattern, there has been widely employed a variable pitching method in which lateral grooves positioned at a certain axial position in the tread are circumferentially arranged at non-uniform pitches. In such variable pitched tread pattern, accordingly, domains (g) each defined between the circumferentially adjacent lateral grooves (u) (such domains are usually formed as independent blocks) have several different circumferential lengths or sizes as diagrammatically shown in FIG. 7 for explanation purpose only.

Such variable pitching method can be employed in a tread pattern of all-season tire suitable for driving on wet and dry pavements as well as driving in light snow.

Figure 7:
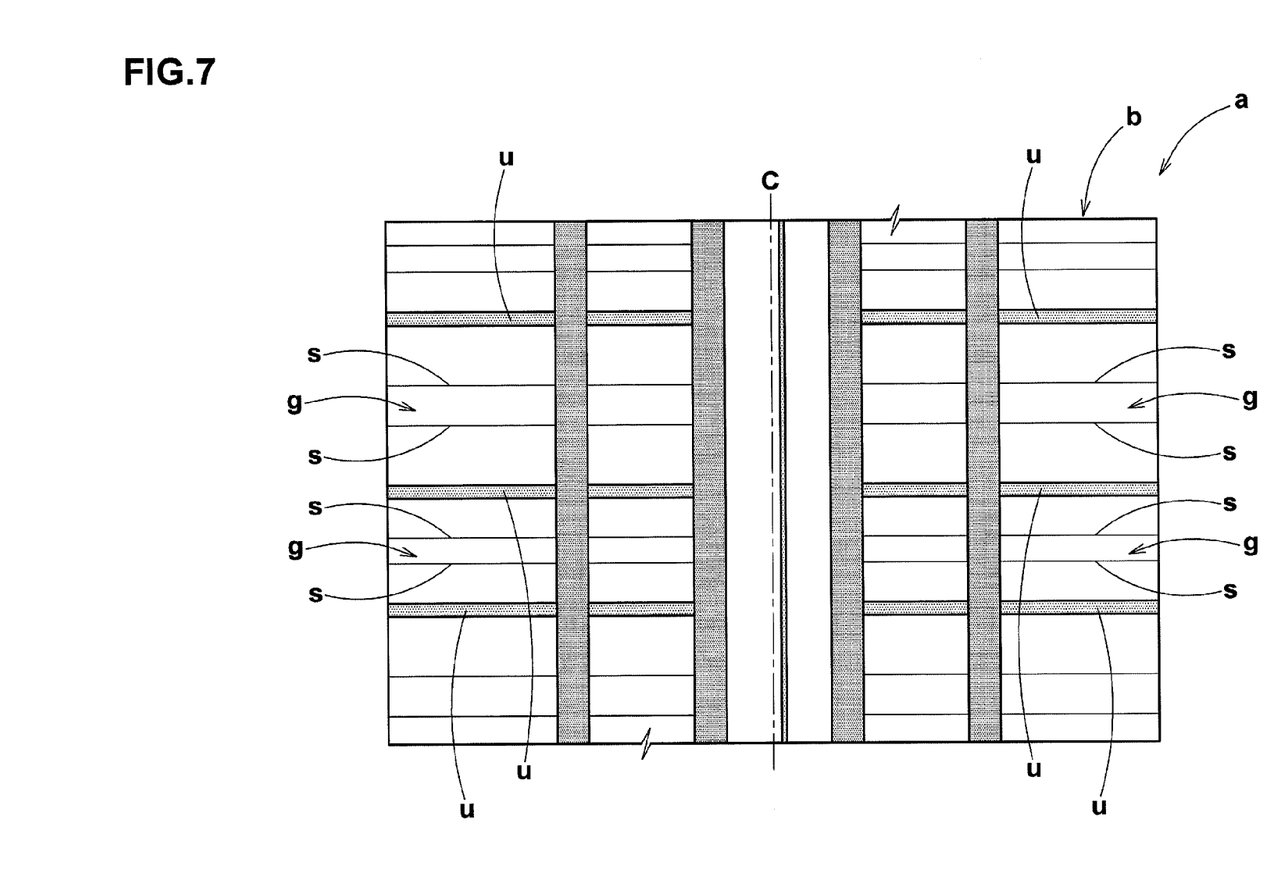
FIG. 7 is a diagram for explaining a problem with tread wear involved in all-season tires having a variable pitched tread pattern.

In the all-season tires, usually, in order to improve the snow/ice performance, the above-mentioned domains such as blocks (g) are each provided with a definite number of lateral sipes (s), for example two sipes per one block as shown in FIG. 7.

As a result, there have been a problem such that tread wear concentrates on relatively small domains or blocks. Such uneven wear is especially remarkable in the tread shoulder region.

SUMMARY OF THE INVENTION

It is therefore, an object of the present invention to provide a pneumatic tire in which the uneven wear resistance can be improved without sacrificing the snow/ice performance even though the tire is provided with a variable pitched tread pattern.

According to the present invention, a pneumatic tire comprises a tread portion provided with a pair of shoulder circumferential grooves disposed one on each side of the tire equator, and a crown circumferential groove disposed on the tire equator or alternatively on each side of the tire equator and between the shoulder circumferential grooves, so as to form a pair of middle land zones each between the crown circumferential groove and one of the shoulder circumferential grooves, and a pair of shoulder land zones each formed between one of the shoulder circumferential grooves and the adjacent tread edge, wherein
the shoulder land zones are each provided with shoulder lateral grooves arranged at variable pitches in the tire circumferential direction and extending to the tread edge at an angle of not more than 30 degrees with respect to the tire axial direction so that domains each defined between the circumferentially adjacent shoulder lateral grooves include a smallest domain having the smallest circumferential length and a largest domain having the largest circumferential length,
the domains are each provided with at least one shoulder sipe extending at an angle of not more than 30 degrees with respect to the tire axial direction toward the tread edge but ending without reaching to the tread edge, and
the number of the shoulder sipe or sipes provided in the smallest domain is less than the number of the shoulder sipes provided in the largest domain.

Therefore, the rigidity difference between the smallest domain and the largest domain is decreased and the uneven wear can be reduced.

Further, the pneumatic tire according to the present invention may be provided with the following optional features:
the axial distance from the tread edge to the end of the shoulder sipe is not more than 5 mm;
on one side of the tire equator, said shoulder lateral grooves extend from the shoulder circumferential groove to said tread edge, and in the shoulder lateral groove, a tie bar protruding from the groove bottom is formed close to the shoulder circumferential groove, whereas on the other side of the tire equator, said shoulder lateral grooves extend from a position apart from the shoulder circumferential groove to said tread edge;
on one side of the tire equator, said at least one shoulder sipe extends to the shoulder circumferential groove, whereas on the other side of the tire equator, said at least one shoulder sipe does not extend to the shoulder circumferential groove;
middle lateral grooves are disposed in the middle land zone on one side of the tire equator but not in the middle land zone on the other side of the tire equator, and
the middle lateral grooves extend across the entire width of the middle land zone at an angle of from 20 to 60 degrees with respect to the tire axial direction;
middle lateral grooves and middle sipes are disposed in the middle land zone on one side of the tire equator but not in the middle land zone on the other side of the tire equator,
the middle lateral grooves extend across the entire width of the middle land zone and incline at an angle of from 20 to 60 degrees with respect to the tire axial direction toward one circumferential direction, and
the middle sipes incline at an angle of from 30 to 70 degrees with respect to the tire axial direction toward the opposite circumferential direction to that of the middle lateral grooves, and two to four middle sipes are disposed between the middle lateral grooves.

In this application including specification and claims, various dimensions, positions and the like of the tire refer to those under a normally inflated unloaded condition of the tire unless otherwise noted.

The normally inflated unloaded condition is such that the tire is mounted on a standard wheel rim and inflate to a standard pressure but loaded with no tire load.

The undermentioned normally inflated loaded condition is such that the tire is mounted on the standard wheel rim and inflate to the standard pressure and loaded with the standard tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used.

The standard pressure and the standard tire load are the maximum air pressure and the maximum tire load for the tire specified by the same organization in the Air-pressure/Maximum-load Table or similar list.

For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at Various Cold Inflation Pressures" table in TRA or the like. The standard load is the "maximum load capacity" in JATMA, the "Load Capacity" in ETRTO, the maximum value given in the above-mentioned table in TRA or the like. In case of passenger car tires, however, the standard pressure and standard tire load are uniformly defined by 180 kPa and 88% of the maximum tire load, respectively.

The tread edges mean the axial outermost edges $2t$ of the ground contacting patch (camber angle=0) in the normally inflated loaded condition.

The tread width means the axial distance TW between the tread edges $2t$ measured in the normally inflated unloaded condition of the tire.

DESCRIPTION OF THE PREFERRED EMBODIMENTS

Embodiments of the present invention will now be described in detail in conjunction with the accompanying drawings.

In the drawings, pneumatic tire 1 according to an embodiment of the present invention is designed as all-season tire suitable for driving on wet and dry pavements as well as driving in light snow.

The pneumatic tire 1 comprises a tread portion 2, a pair of sidewall portions, a pair of axially spaced bead portions, a carcass extending between the bead portions through the tread portion 2 and sidewall portions, and a tread reinforcing belt disposed radially outside the carcass in the tread portion 2 as usual.

Figure 1:
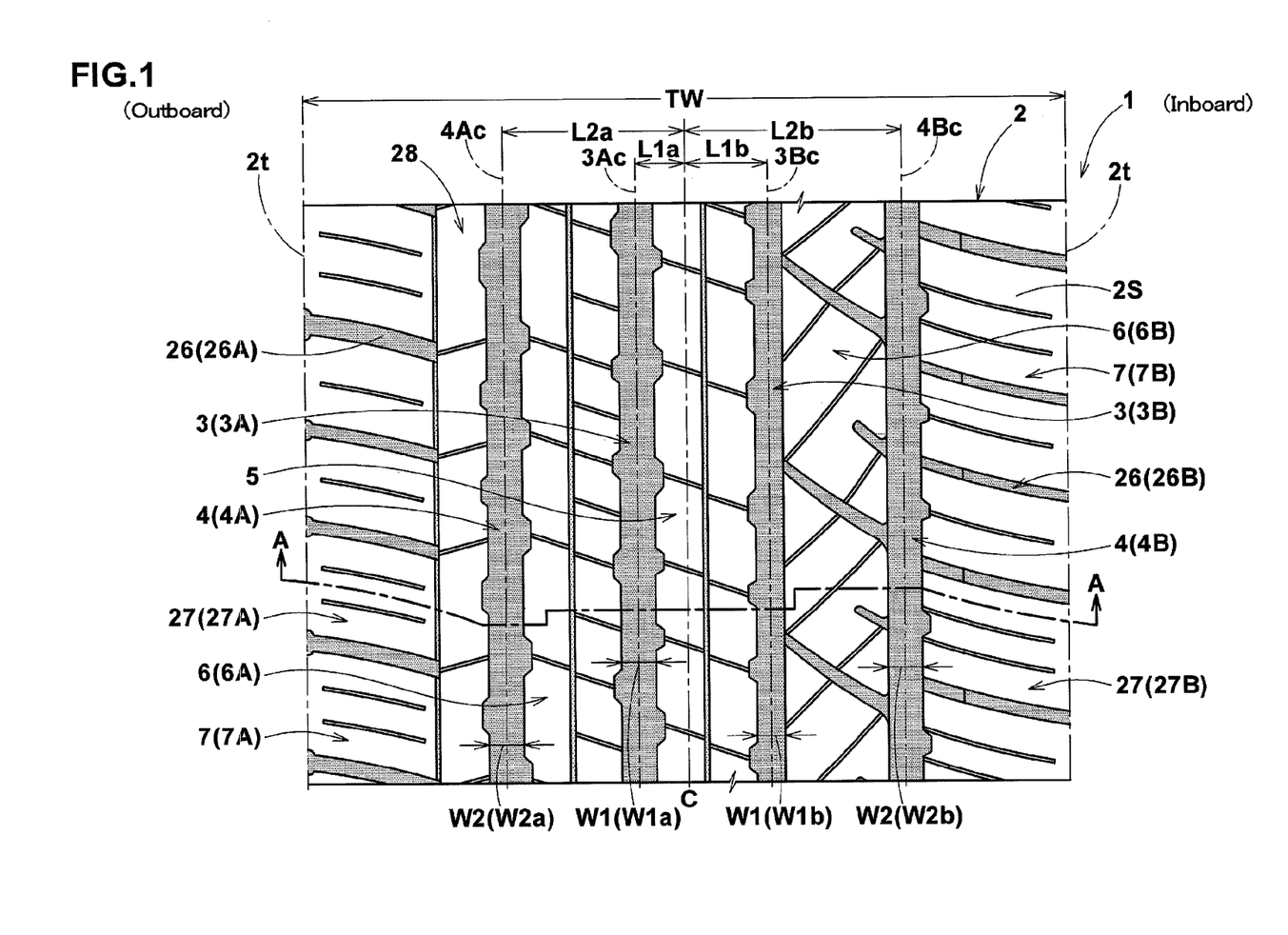
FIG. 1 is a developed partial view of the tread portion of a pneumatic tire according to an embodiment of the present invention.
Figure 2:
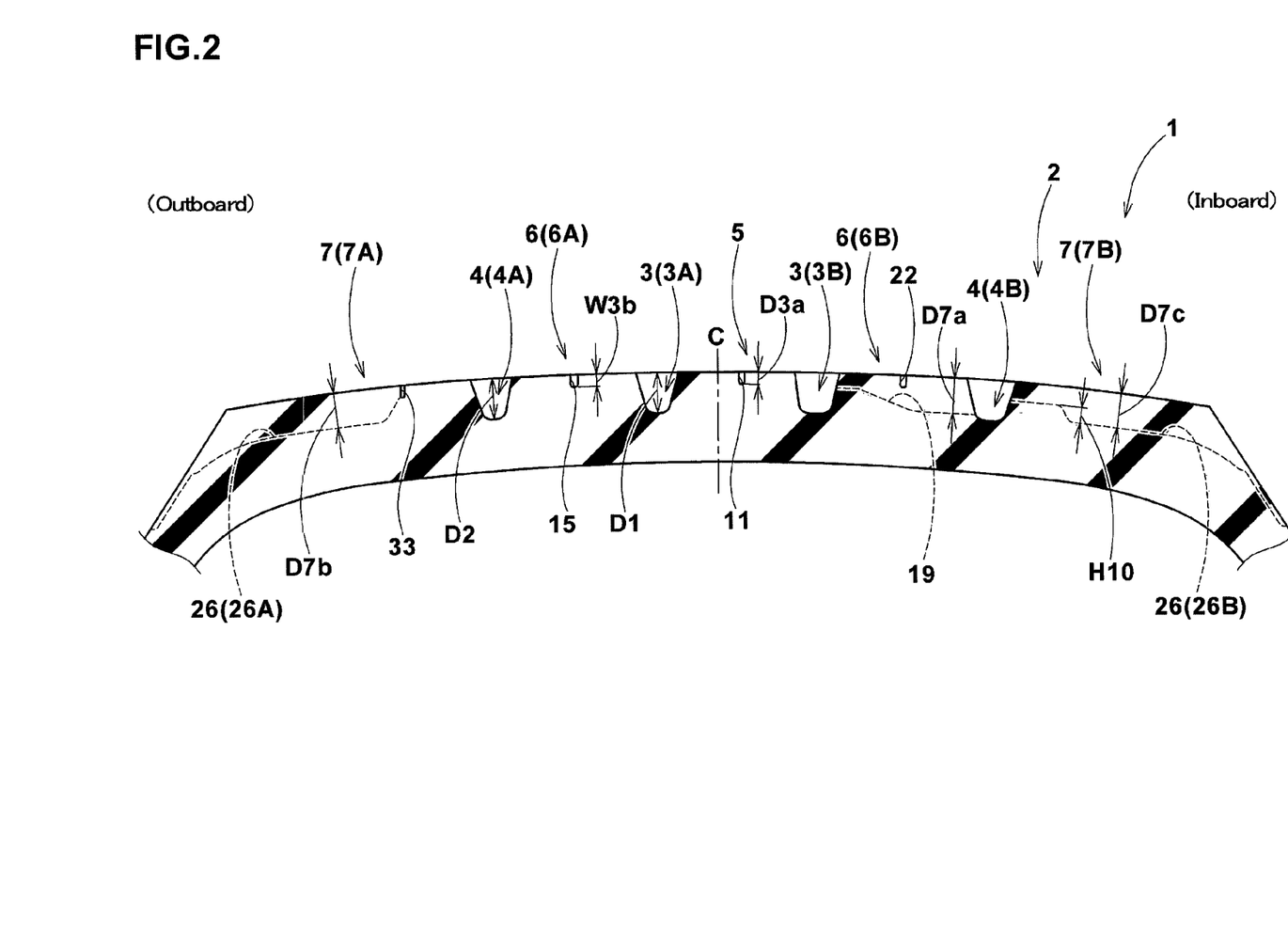
FIG. 2 is a schematic cross sectional view of the tread portion taken along line A-A in FIG. 1.

The tread portion 2 is provided with circumferentially continuously extending grooves including a pair of shoulder circumferential grooves 4 disposed one on each side of the tire equator C and a pair of crown circumferential grooves 3 disposed one on each side of the tire equator C and between the shoulder circumferential grooves 4. The tread portion 2 is therefore divided into a center land zone 5 defined between the crown circumferential grooves 3, a pair of middle land zones 6 defined between the crown circumferential grooves 3 and shoulder circumferential grooves 4, and a pair of shoulder land zones 7 defined between the shoulder circumferential grooves 4 and the tread edges $2t$.

Instead of the two crown circumferential grooves 3, a single crown circumferential groove 3 may be provided on the tire equator C as another embodiment. In this case, only the two middle land zones 6 and two shoulder land zones 7 are defined.

In any case, the crown circumferential groove 3 is preferably formed as a straight groove whose edges are straight and parallel with the circumferential direction. Preferably, the crown circumferential groove 3 has a groove width W1 of from 2 to 7% of the tread width TW and a groove depth D1 of from 6 to 10 mm.

By using such straight groove, the drainage toward the backward is enhanced to improve the wet performance, therefore, the use of a straight groove is preferred.

In this embodiment, the tire 1 is provided with a tread pattern which is asymmetrical about the tire equator C, and for which the tire mounting position on the vehicle is specified. Therefore, indications of the tire mounting position (for example "INSIDE", "OUTSIDE" and the like) are provided on the tire sidewall portions as usual.

In this application, for the sake of explanation, the inboard tread edge $2t$ refers to one of the two tread edges $2t$ which is intended to be positioned towards the center of the vehicle body. The outboard tread edge $2t$ refers to the other tread edge $2t$ which is intended to be positioned away from the center of the vehicle body.

Further, the terms "outboard" and "inboard" are used toward the outboard tread edge and inboard tread edge, respectively, to refer relative positions or directions with respect to the tire axial direction.

Thus, the above-mentioned crown circumferential grooves 3 are the outboard crown circumferential groove 3A and the inboard crown circumferential groove 3B.

By the asymmetrical groove arrangement, the outboard crown circumferential groove 3A is disposed closer to the tire equator C than the inboard crown circumferential groove 3B, and the groove width W1$a$ of the outboard crown circumferential groove 3A is set to be larger than the groove width W1$b$ of the inboard crown circumferential groove 3B in order to effectively improve the drainage and snow performance during straight running and cornering.

Preferably, the axial distance L1$a$ between the tire equator C and the groove center line 3A of the outboard crown circumferential groove 3A is set in a range of from 30 to 70% of the axial distance L1$b$ between the tire equator C and the groove center line 3B of the inboard crown circumferential groove 3B, and the groove width W1$a$ of the outboard crown circumferential groove 3A is set in a range of from 110 to 140% of the groove width W1$b$ of the inboard crown circumferential groove 3B.

The shoulder circumferential groove 4 is also formed as a straight groove whose edges are straight and parallel with the circumferential direction, and the shoulder circumferential groove preferably has a groove width W2 of from 2 to 7% of the tread width TW and a groove depth D2 of from 6 to 10 mm in order to improve the drainage and snow performance.

The above-mentioned shoulder circumferential grooves 4 are the outboard shoulder circumferential groove 4A and the inboard shoulder circumferential groove 4B.

The outboard shoulder circumferential groove 4A is disposed closer to the tire equator C than the inboard shoulder circumferential groove 4B, and the axial distance L2$a$ between the tire equator C and the groove center line 4Ac of the outboard shoulder circumferential groove 4A is preferably set in a range of from 60 to 90% of the axial distance L2$b$ between the tire equator C and the groove center line 4Bc of the inboard shoulder circumferential groove 4B in order to increase the land ratio near the outboard tread edge $2t$ and thereby to increase the tread rigidity during cornering and to improve the steering stability.

The center land zone 5 is formed as a straight rib circumferentially continuity extending on the tire equator C.

Figure 3:
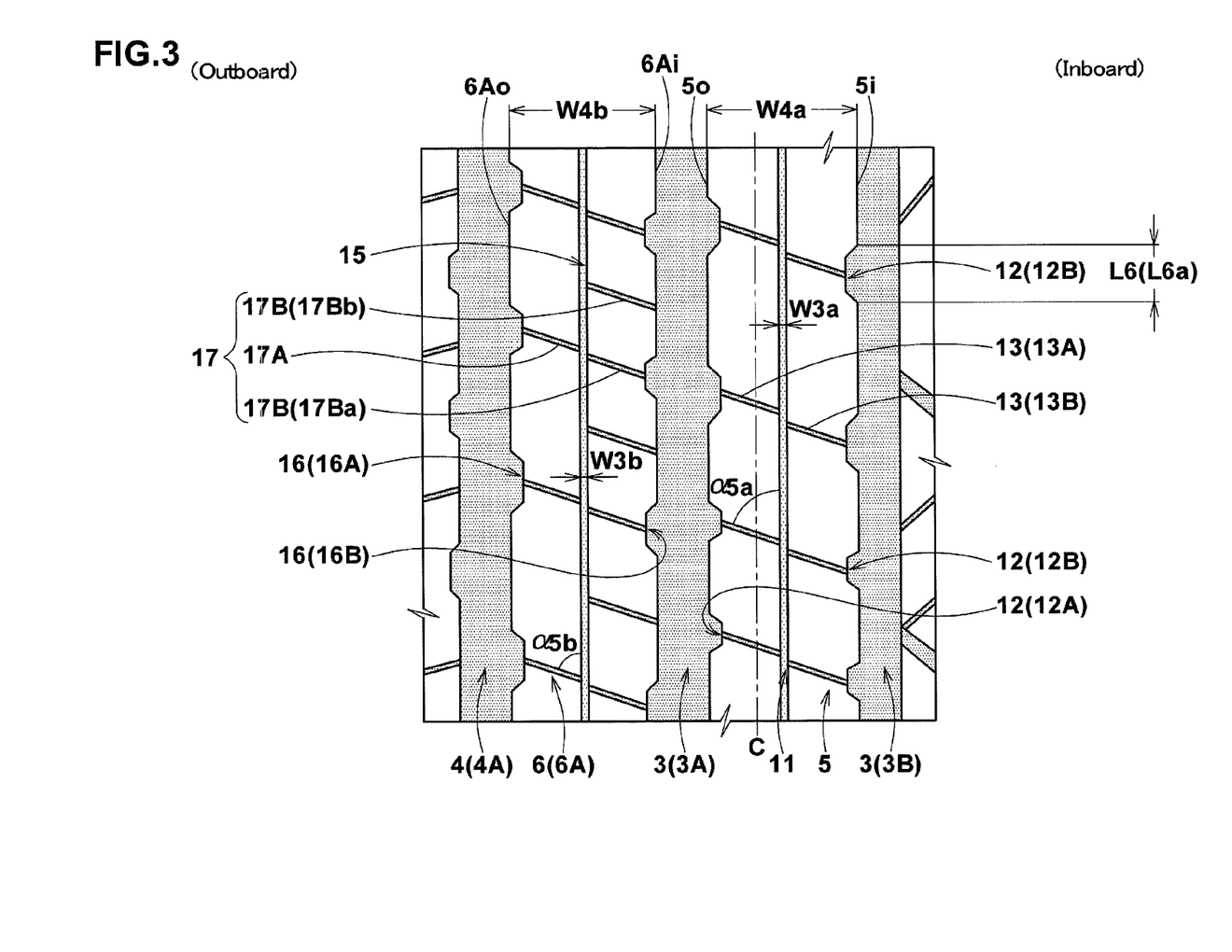
FIG. 3 is an enlarged partial view of the tread portion showing a center land zone and an outboard middle land zone.

In order to maintain the rigidity of the center land zone 5 and thereby to improve the straight running stability, the center land zone is not crossed by grooves wider than the sipes. In this embodiment, as shown in FIG. 3, the center land zone 5 is provided with a center sub groove 11 extending continuously in the tire circumferential direction, and a plurality of indentations 12 on both edges 5o and 5i of the center land zone 5, and further a plurality of center sipes 13 extending from the center sub groove 11 to the indentations 12 respectively.

The center sub groove 11 is disposed on the inboard tread edge side of the widthwise center (in this example, the tire equator C) of the center land zone 5. The center sub groove 11 is preferably formed to have a groove width W3a of from 3 to 7% of the maximum width W4a of the center land zone 5 and a groove depth D3a of from 1.5 to 3.5 mm in order to improve the wet grip performance.

The above-mentioned indentations 12 are the outboard indentations 12A on the outboard edge 5o and the inboard indentations 12B on the inboard edge 5, which are arranged staggeredly in the tire circumferential direction.
The indentations 12A and 12B are configured such that the circumferential length L6 is gradually decreased from the respective edges 5o and 5i toward the widthwise center of the center land zone 5 so that the indentation has a substantially trapezoidal shape in its top view. Preferably, the maximum circumferential length L6a of the indentation is set in a range of from 6 to 10 mm and the depth thereof is set in a range of from 6 to 9 mm. Therefore, the outboard indentations 12A and inboard indentations 12B can be engaged with the snow packed thereinto and it is possible to improve the snow performance by utilizing the shearing force of the packed snow. By the stagger arrangement of the outboard and inboard indentations 12A and 12B, the generation of the shearing force becomes smooth in the tire circumferential direction.

The center sipes 13 are inclined to the same direction at an angle $\alpha 5a$ of from 50 to 80 degrees with respect to the tire circumferential direction.

The center sipes 13 are the outboard sipes 13A and the inboard sipes 13B.

The outboard sipes 13A are disposed on the outboard tread edge side of the center sub groove 11 and connected to inner ends of the outboard indentations 12A. The inboard sipes 13B are disposed on the inboard tread edge side of the center sub groove 11 and connected to inner ends of the inboard indentations 12B. Accompanying the stagger arrangement of the outboard and inboard indentations 12A and 12B, the phase of the outboard sipes 13A is circumferentially sifted from that of the inboard sipes 13B. The outboard and inboard sipes 13A and 13B increase edges in the center land zone 5, and improve the wet performance and the ice performance such as traction. Further, the center land zone 5 is not crossed by lateral grooves wider than the sipes in order to maintain rigidity. This also helps to improve uneven wear in the center land zone 5.

The above-mentioned middle land zones 6 are the outboard middle land zone 6A and the inboard middle land zone 6B.

The outboard middle land zone 6A is constructed as a substantially straight rib similar to the center land zone 5 as shown in FIG. 3. In order to maintain the lateral stiffness (rigidity) of the outboard middle land zone 6A and thereby to improve the steering stability, the outboard middle land zone 6A is not crossed by grooves wider than the sipes. More specifically, the outboard middle land zone 6A is provided with an outboard middle sub groove 15 extending continuously in the tire circumferential direction, and a plurality of indentations 16 on both edges 6Ao and 6Ai of the outboard middle land zone 6A, and further a plurality of outboard middle sipes 17 extending from the outboard middle sub groove 15 toward the edges 6Ao and 6Ai.

The outboard middle sub groove 15 extends continuously in the tire circumferential direction on the widthwise center line of the outboard middle land zone 6A.

In view of the wet performance, it is preferable that the outboard middle sub groove 15 has a groove width W3b of from 3 to 7% of the maximum width W4b of the outboard middle land zone 6A, and a groove depth D3b of from 1.5 to 3.5 mm.

The indentations 16 are the outboard indentations 16A on the outboard edge 6Ao and the inboard indentations 16B on the inboard edge 6Ai, which are arranged staggeredly in the tire circumferential direction. In order to improve the snow performance as explained above, the indentation 16A, 16B has a substantially trapezoidal shape in its top view.

The outboard middle sipes 17 are inclined to the same direction at an angle $\alpha 5b$ of from 50 to 80 degrees with respect to the tire circumferential direction.

Further, the outboard middle sipes 17 are the outboard sipes 17A and the inboard sipes 17B.
The outboard sipes 17A are disposed on the outboard tread edge side of the outboard middle sub groove 15 and extend from the outboard middle sub groove 15 to the outboard indentations 16A respectively.
The inboard sipes 17B are disposed on the inboard tread edge side of the outboard middle sub groove 15. Further, the inboard sipes 17B are the first inboard sipes 17Ba and the second inboard sipes 17Bb. The first inboard sipes 17Ba extend from the outboard middle sub groove 15 to the inboard indentations 16B respectively. The second inboard sipes 17Bb are each disposed between the circumferentially adjacent first inboard sipes 17Ba and extend from the outboard middle sub groove 15 to the inboard edge 6Ai in parallel with the first inboard sipes 17Ba.
The outboard and inboard sipes 17A and 17B increase edges in the outboard middle land zone 6A, and improve the wet performance and the ice performance such as traction. Further, owing to the second inboard sipes 17Bb, the edges are increased in the inboard side of the outboard middle land zone 6A than in the outboard side, and thereby, the ice performance during straight running can be improved.

Figure 4:
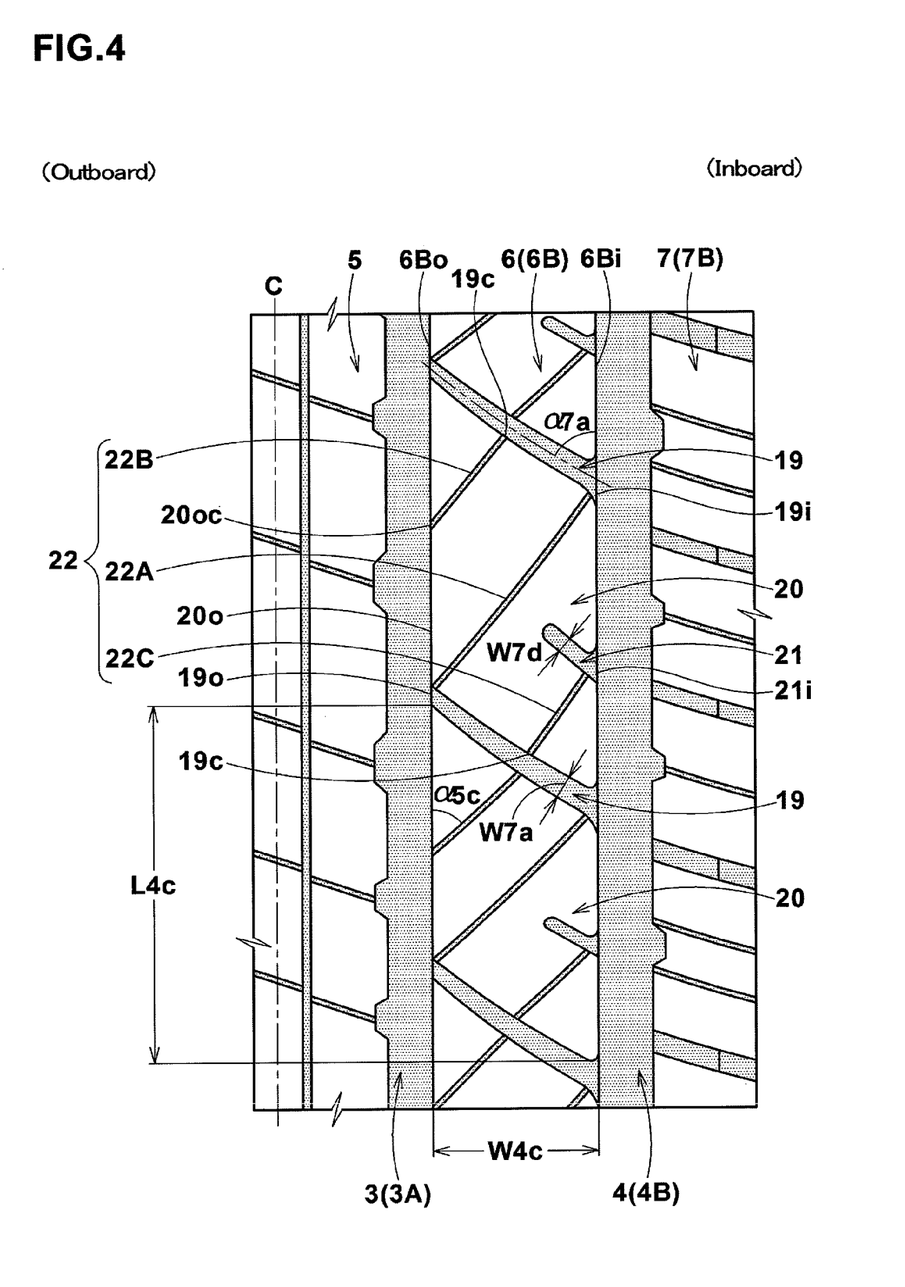
FIG. 4 is an enlarged partial view of the tread portion showing an inboard middle land zone.

The inboard middle land zone 6B is as shown in FIG. 4 provided with a plurality of inboard middle lateral grooves 19 extending across the entire width thereof at an angle $\alpha 7a$ of from 20 to 60 degrees with respect to the tire axial direction so that the inboard middle land zone 6B is divided into inboard middle blocks 20 arranged circumferentially of the tire.
From the inboard edge 6Bi to the outboard edge 6Bo of the inboard middle land zone 6B, the inboard middle lateral groove 19 is gradually decreased in the groove width W7a and the groove depth D7a and also the angle $\alpha 7a$ with respect to the circumferential direction so as to curve slightly in order to improve the uneven wear resistance.
Preferably, the groove width W7a is set in a range of from 1 to 6% of the tread width TW, and the groove depth D7a is set in a range of from 6 to 9 mm in order to improve the wet performance (drainage) and snow performance (snow grip).

The inboard middle block 20 in this example is configured to have a circumferentially-long parallelogram shape such that the circumferential length L4c is larger than the axial width W4c. Preferably, the axial width W4c is set in a range of from 10 to 15% of the tread width TW, and the circumferential length L4c is set in a range of from 150 to 250% of the axial width W4c. Therefore, the circumferential rigidity of the inboard middle block 20 is increased, and the road grip especially traction is increased, thereby the steering stability and snow performance can be improved.

The inboard middle block 20 in this embodiment is provided with a slot 21 and a plurality of inboard middle sipes 22.

The slot 21 extends substantially parallel with the adjacent inboard middle lateral grooves 19 from the inboard edge 6Bi of the inboard middle land zone 6B and terminates without reaching to the outboard edge 6Bo. Preferably, the slot 21 has a groove width W7d of from 1 to 4 mm, and a groove depth of from 1 to 4 mm. Thus, it is possible to improve the wet performance as well as to utilize the shearing force of the packed show therein to improve the snow performance.

The inboard middle sipes 22 are, with respect to the tire axial direction, inclined at an angle $\alpha 5c$ of from 30 to 70 degrees toward the opposite direction to the inboard middle lateral grooves 19 in order to increase the traction on icy roads during straight running and during cornering.

It is preferable that the number of the inboard middle sipes 22 per one inboard middle block 20 is not less than 2 and not more than 4. If the number is less than 2, it is difficult to fully improve the ice performance. If the number is more than 4, there is a possibly that the rigidity of the inboard middle block 20 becomes insufficient.

In this embodiment, in order to increase the circumferential component and axial component of the edges over a wide range, the inboard middle sipes 22 on one block include as shown in FIG. 4,
a central sipe 22A extending from near the inboard end 19i of the inboard middle lateral groove 19 to near the outboard end 19o of the circumferentially adjacent inboard middle lateral groove 19,
an outboard sipe 22B extending from near the axial midpoint 19 of the inboard middle lateral groove 19 to near the circumferential midpoint 20oc of the outboard edge 20o of the inboard middle block 20, and
an inboard sipe 22C extending from near the inboard end 21i of the slot 21 to near the axial midpoint 19c of the inboard middle lateral groove 19.
Each of the inboard middle blocks 20 is provided with the above-mentioned three sipes 22A, 22B and 22C.

The above-mentioned shoulder land zones 7 of the tread portion 2 are each provided with a plurality of shoulder lateral grooves 26 extending in a direction crosswise to the shoulder circumferential groove 4 and arranged at intervals in the tire circumferential direction to thereby form domains 27 each defined between the circumferentially adjacent shoulder lateral grooves 26.

As shown in FIG. 1, the shoulder land zones 7 are
the outboard shoulder land zone 7A provided with the outboard shoulder lateral grooves 26A, and
the inboard shoulder land zone 7B provided with the inboard shoulder lateral grooves 26B.

Figure 5:
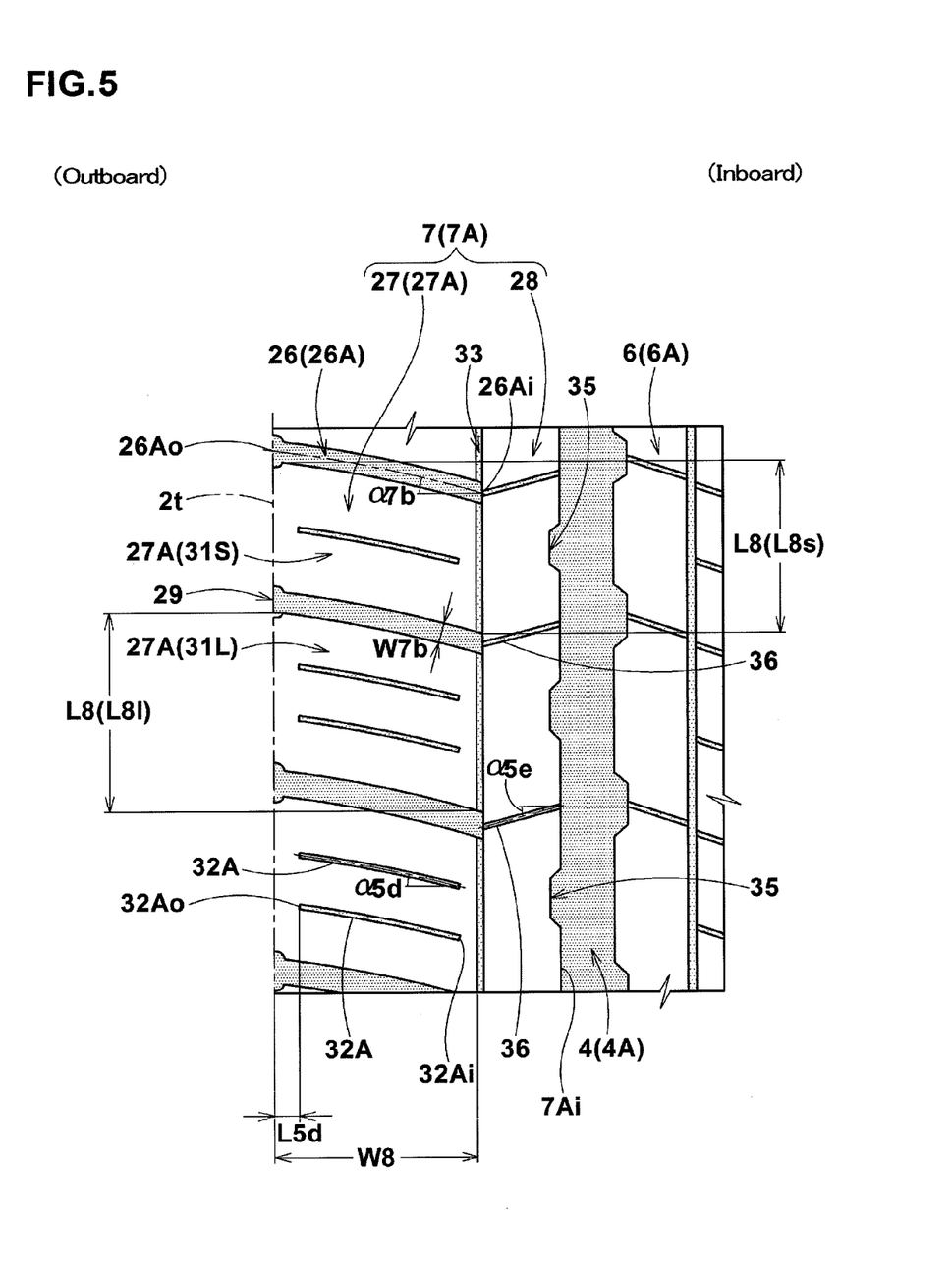
FIG. 5 is an enlarged partial view of the tread portion showing an outboard shoulder land zone.

As shown in FIG. 5, in the outboard shoulder land zone 7A, the outboard shoulder lateral groove 26A has
an outboard end 26Ao opened at the outboard tread edge 2t, and
an inboard end 26Ai closed at a distance from the outboard shoulder circumferential groove 4A. Accordingly, in the outboard shoulder land zone 7A, a circumferentially continuously extending rib-like part 28 is formed on the inboard tread edge side of the outboard domains 27A defined between the outboard shoulder lateral grooves 26A, and thereby the rigidity of the outboard shoulder land zone 7A is maintained.

From the inboard end 26Ai to the outer end 26Ao, the angle $\alpha 1b$ of the outboard shoulder lateral groove 26A with respect to the tire axial direction is gradually decreased within a range between 0 and 30 degrees so as to curve slightly.

Preferably, the outboard shoulder lateral groove 26A is formed to have a groove width W7b of from 1 to 6% of the tread width TW, and a groove depth D7b of from 6 to 9 mm. Therefore, the outboard shoulder lateral grooves 26A can increase the drainage and can increase the shearing force of the snow packed thereinto, and the steering stability, drainage and snow performance can be satisfied.

Further, the outboard shoulder lateral groove 26A is locally increased in the groove width near the outer end 26Ao to form a wide part 29. Therefore, the wide part 29 can produce a large shearing force of packed snow during cornering and the snow performance can be improved.

In this embodiment, the outboard domain 27A has a substantially parallelogram shape in its top view of which axial width W8 is substantially same as or more than its circumferential length L8. Preferably, the axial width W8 is set in a range of from 20 to 30% of the tread width TW, and the circumferential length L8 is set in a range of from 90 to 110% of the axial width W8 in order to increase the lateral stiffness (rigidity) of the outboard domain 27A and thereby improve the steering stability and snow performance.

The shoulder lateral grooves 26A are circumferentially arranged according to a variable pitching method as well known in the art. Therefore, the outboard domains 27A between the shoulder lateral grooves 26A include plural kinds of domains having different circumferential lengths, including a smallest domain 31S having the smallest circumferential length L8 (L8s) and a largest domain 31L having the largest circumferential length L8 (L8l).

Each of the outboard domains 27A is provided with at least one outboard shoulder sipe 32A.

The outboard shoulder sipe 32A has closed ends 32Ao and 32Ai within the outboard domain 27A. Accordingly, the sipe 32A does not reach to the outboard tread edge 2t and the rib-like part 28.

The outboard shoulder sipe 32A is slightly curved at an angle $\alpha 5d$ within a range between 0 and 30 degrees with respect to the tire axial direction.

The outboard shoulder sipe(s) 32A increase the edges of the outboard domain 27A without excessively decreasing the rigidity of outboard domain 27A, and the ice performance, uneven wear resistance and steering stability can be improved in a well balanced manner.

If the angle $\alpha 5d$ of the outboard shoulder sipe 32A exceeds 30 degrees, the rigidity of the outboard domains 27A is decreased and uneven wear is liable to occur. If the angle $\alpha 5d$ is small, the circumferential component of the edges is decreased and the ice performance during cornering can not be fully improved.

From this standpoint, the angle $\alpha 5d$ is preferably set to be not less than 10 degrees, more preferably not less than 15 degrees.

Preferably, the axial distance L5d between the tread edge 2t and the outboard end 32Ao of the outboard shoulder sipe 32A is set to be not more than 10 mm, more preferably not more than 5 mm in order to increase the edge length, but in order to prevent the rigidity of the outboard domain 27A from excessively decreasing and thereby to prevent uneven wear, the axial distance L5$d$ is set to be more than 0 mm, more preferably not less than 2 mm The number N1 of the outboard shoulder sipe(s) 32A disposed in the smallest domain 31S (in this embodiment, 1) is set to be less than the number N2 of the outboard shoulder sipes 32A disposed in the largest domain 31L (in this embodiment, 2). Preferably, the difference (N2-N1) in the outboard shoulder sipe number between the largest domain 31L and the smallest domain 31S is at least 1 and at most 2, namely, 1 or 2.

In the outboard shoulder land zone 7A, therefore, the rigidity difference between the smallest domain 31S and the largest domain 31L is decreased and the uneven wear can be reduced.

Further, for each outboard domain 27A whose circumferential length L8 is not more than 67% of the circumferential length L8$l$ of the largest domain 31L, if any, the number of the outboard shoulder sipe(s) is decreased lower than that in the largest domain 31L in order to effectively improve the uneven wear resistance by decreasing the rigidity variation of the outboard shoulder land zone 7A in the tire circumferential direction.

The above-mentioned rib-like part 28 is provided with indentations 35 and inboard sipes 36. In this embodiment, the indentations 35 and inboard sipes 36 are alternately disposed in the circumferential direction.

The indentations 35 are disposed on the inboard edge 7Ai of the outboard shoulder land zone 7A, and has a substantially trapezoidal shape similarly to the above-mentioned indentations 12A and 12B of the center land zone 5 in order to improve the snow performance.

The inboard sipes 36 are extended from the respective outboard shoulder lateral grooves 26A to the outboard shoulder circumferential groove 4A, and the inboard sipes 36 are inclined oppositely to the outboard shoulder sipes 32A with respect to the tire axial direction at an angle $\alpha 5e$ of from 10 to 30 degrees with respect to the tire axial direction in order to increase the edges without excessively decreasing the rigidity of the rib-like part 28 and thereby to improve the ice performance such as traction.

Further, between the outboard domains 27A and the rib-like part 28, a shoulder sub groove 33 extending straight and continuously in the tire circumferential direction is disposed to improve the drainage in the outboard shoulder land zone 7A.

Figure 6:
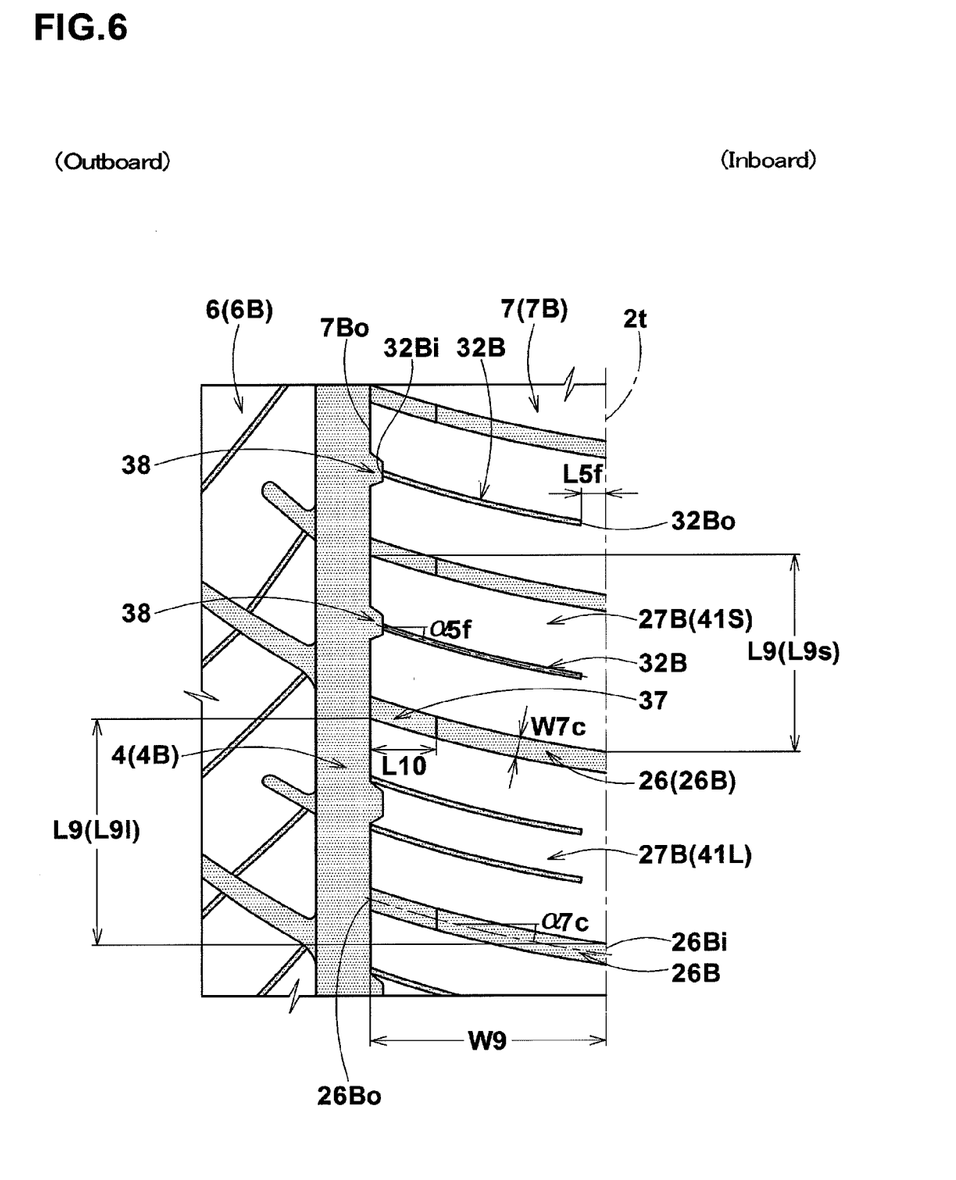
FIG. 6 is an enlarged partial view of the tread portion showing an inboard shoulder land zone.

The above-mentioned inboard shoulder land zone 7B is as shown in FIG. 6, provided with a plurality of inboard shoulder lateral grooves 26B each having an outboard end 26Bo opened to the inboard shoulder circumferential groove 4B and an inboard end 26Bi opened to the inboard tread edge 2$t$ to form inboard domains 27B each defined between the circumferentially adjacent inboard shoulder lateral grooves 26B.

Therefore, unlike the above-mentioned outboard domains 27A, the inboard domains 27B face the inboard shoulder circumferential groove 4B and are separated from each other.

From the outer end 26Bo to the inboard end 26Bi, the angle $\alpha 7c$ of the inboard shoulder lateral groove 26B is gradually decreased within a range between 0 and 30 degrees with respect to the tire axial direction so as to curve slightly. Preferably, the groove width W7$c$ and groove depth D7$c$ of the inboard shoulder lateral groove 26B are set in the same ranges as those of the outboard shoulder lateral groove 26A. Therefore, the inboard shoulder lateral grooves 26B increase the drainage and the shearing force of the snow packed thereinto, and the wet performance and snow performance can be improved.

The inboard shoulder lateral groove 26B is provided with a tie bar 37 close to the shoulder circumferential groove 4B.

The tie bar 37 is a shallower part protruding from the groove bottom and extending between the opposed sidewalls of the groove. Preferably, the axial length L10 of the tie bar 37 is set in a range of not less than 5 mm, more preferably not less than 10 mm, but not more than 20 mm, more preferably not more than 15 mm, and the height H10 of the tie bar 37 from the bottom of the inboard shoulder lateral groove 26B is set in a range of not less than 20%, more preferably not less than 40%, but not more than 80%, more preferably not more than 60% of the groove depth D7$c$ (max.) of the inboard shoulder lateral groove 26B.

Therefore, the tie bars 37 increase the circumferential rigidity of the inboard shoulder land zone 7B and thereby the uneven wear resistance can be increased. If the axial length L10 is more than 20 mm and/or the height H10 is more than 80%, as the groove volume decreases, there is a possibility that the snow performance and drainage are deteriorated.

The inboard domain 27B has a substantially parallelogram shape in its top view of which axial width W9 is substantially same as or more than its circumferential length L9. Preferably, the axial width W9 is set in a range of from 15 to 25% of the tread width TW, and the circumferential length L9 is set in a range of from 75 to 100% of the axial width W9 in order to improve the steering stability and snow performance.

The shoulder lateral grooves 26B are circumferentially arranged according to a variable pitching method. Therefore, the inboard domains 27B between the shoulder lateral grooves 26B include plural kinds of domains having different circumferential lengths, including a smallest domain 41S having the smallest circumferential length L9 (L9$s$) and a largest domain 41L having the largest circumferential length L9 (L9$l$).

The inboard domains 27B are each provided with an indentation 38 and at least one inboard shoulder sipe 32B.

The indentation 38 is provided on the outboard edge 7Ao and has a substantially trapezoidal shape in its top view.

The inboard shoulder sipe 32B has an outboard end 32Bi opened toward the inboard shoulder circumferential groove 4B and an inboard end 32Bo closed at a distance from the inboard tread edge 2$t$. The inboard shoulder sipe 32B is slightly curved at an angle $\alpha 5f$ within a range between 0 and 30 degrees with respect to the tire axial direction. Preferably, the angle $\alpha 5df$ is not less than 10 degrees, more preferably not less than 15 degrees.

Further, the axial distance L5$f$ of the inboard end 32Bo from the inboard tread edge 2$t$ is preferably not more than 10 mm, more preferably not more than 5 mm in order to increase the edge length. But in order to prevent the rigidity of the inboard domain 27B from excessively decreasing, the axial distance L5$f$ is more than 0 mm, preferably not less than 2 mm. Therefore, the ice performance, uneven wear resistance and steering stability can be improved.

The number N3 of the inboard shoulder sipe or sipes 32B disposed in the smallest domain 41S (in this embodiment, 1) is set to be less than the number N4 of the inboard shoulder sipes 32B disposed in the largest domain 41L (in this embodiment, 2). Preferably, the difference (N4-N3) in the inboard shoulder sipe number between the largest domain 41L and the smallest domain 41S is at least 1 and at most 2, namely, 1 or 2. Therefore, the rigidity difference between the smallest domain 41S and the largest domains 41L is decreased and the uneven wear can be reduced.

Further, for each inboard domain 27B whose circumferential length L9 is not more than 67% of the circumferential length L9$l$ of the large domain 41L, if any, the number of the inboard shoulder sipe(s) is decreased lower than that in the largest domain 41L in order to effectively improve the uneven wear resistance by decreasing the rigidity variation of the inboard shoulder land zone 7B in the tire circumferential direction.

Comparison Tests

Based on the tread pattern shown in FIG. 1, test tires having domains and shoulder sipes shown in Table 1 were prepared and tested.

Common specifications are as follows.

tire size: P235/60R18 (rim size: 18 × 7.5)
tread width TW: 198 mm
outboard crown circumferential groove 3A groove depth D1: 8.2 mm
groove width W1a: 8.7 mm
distance L1a: 12.45 mm
inboard crown circumferential groove 3B groove depth D1: 8.2 mm
groove width W1b: 7.1 mm,
distance L1b: 20.85 mm
outboard shoulder circumferential groove 4A groove width W2: 8.7 mm
groove depth D2: 8.2 mm
distance L2a: 45.85 mm
inboard shoulder circumferential groove 4B groove width W2: 8.7 mm
groove depth D2: 8.2 mm
distance L2b: 54.7 mm
center sub groove 11, outboard middle sub groove 15:

groove widths W3a, W3b: 1.3 mm,
groove depths D3a, D3b: 2.5 mm
outboard, inboard indentation 16A, 16B:

maximum length L6a: 10.5 mm,
depth: 8.2 mm
center sipe 13, outboard middle sipe 17:

angle α5a, α5b: 70 degrees
inboard middle lateral grooves 19:

angle α7a: 70 degrees,
groove width W7a: 4.9 mm,
groove depth D7a: 8.2 mm
inboard middle block 20:

width W4c: 29.0 mm,
length L4c: 58.0 to 66.0 mm
slot 21:

groove width W7d: 3.5 mm
groove depth: 5.8 mm
inboard middle sipe 22:

angle α5c: 60 degrees
outboard shoulder lateral groove 26A:

angle α7b: 10 degrees,
groove width W7b: 6.0 mm,
groove depth D7b: 7.2 mm outboard domain 27A:

width W8: 56.3 mm,
length L8: 21.4 to 32.1 mm (L8s = 21.4 mm, L8l = 32.1 mm)
inboard sipe 36:

angle α5e: 10 degrees
inboard shoulder lateral grooves 26B:

angle α7b: 10 degrees,
groove width W7c: 6.0 mm,
groove depth D7c: 7.2 mm
inboard domains 27B:

width W9: 56.3 mm,
length L9: 21.4 to 32.1 mm (L9s = 21.4 mm, L9l = 32.1 mm)

<Snow Performance Test and Ice Performance Test>

Using a Japanese-made 3500 cc passenger car provided on the four wheels with test tires (tire pressure 220 kPa), the test driver evaluated the snow performance based on the straight running stability, braking stability, steering response, rigidity, grip and the like during running on a snowy road of a tire test course. The results are indicated in Table 1 by an index based on Comparative example tire Ref.1 being 100, wherein the larger the index number, the better the snow performance.

Further, the ice performance was evaluated by the running distance to stop when the test car running on an ice-covered road of the tire test course at a speed of 30 km/h was suddenly braked to lock all the wheels. The results are indicated in Table 1 by an index based on Embodiment tire Ex.1 being 100, wherein the larger the index number, the better the ice performance.

<Wear Resistance Test>

The above-mentioned car was run for 10000 km on expressway, city streets and mountain roads. Then, the smallest domains and largest domains in the outboard shoulder land zone and those in the inboard shoulder land zone were measured for the amount of wear at three circumferential positions around the tire. For each test tire, the difference between the average of amount of wear of the smallest domains and the average of amount of wear of the largest domains was calculated. As the test results, the reciprocal of the average is indicated in Table 1 by using an index based on the comparative example tire Ref.1 being 100, therefore, the larger the value, the better the wear resistance.

From the test results, it was confirmed that according to the present invention, the uneven wear resistance can be improved without sacrificing the snow/ice performance.

As explained, the present invention is premised on that all of the domains which are circumferentially arranged in a row have similar shapes such that, by uniformly expanding the smallest domain only in the tire circumferential direction, larger domains can be achieved.

TABLE 1

| Tire | Ref. 1 | Ref. 2 | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|---|---|
| Outboard domain | | | | | | | | | | | | |
| sipe number N1 in smallest domain | 2 | 2 | 1 | 1 | 1 | 1 | 1 | 1 | 1 | 1 | 1 | 1 |
| sipe number N2 in largest domain | 2 | 2 | 2 | 2 | 2 | 2 | 2 | 2 | 2 | 2 | 2 | 2 |
| Inboard domain | | | | | | | | | | | | |
| sipe number N3 in smallest domain | 2 | 2 | 1 | 1 | 1 | 1 | 1 | 1 | 1 | 1 | 1 | 1 |
| sipe number N4 in largest domain | 2 | 2 | 2 | 2 | 2 | 2 | 2 | 2 | 2 | 2 | 2 | 2 |

TABLE 1-continued

| Tire | Ref. 1 | Ref. 2 | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|---|---|
| Outboard shoulder sipe | | | | | | | | | | | | |
| angle α5d (deg.) | 10-30 | 30-50 | 10-30 | 15-30 | 5-10 | 10-30 | 10-30 | 10-30 | 10-30 | 10-30 | 10-30 | 10-30 |
| distance L5d (mm) | 10 | 10 | 10 | 10 | 10 | 15 | 5 | 10 | 10 | 10 | 10 | 10 |
| Inboard shoulder sipe | | | | | | | | | | | | |
| angle α5f (deg.) | 10-30 | 30-50 | 10-30 | 15-30 | 5-10 | 10-30 | 10-30 | 10-30 | 10-30 | 10-30 | 10-30 | 10-30 |
| distance L5f (mm) | 5 | 5 | 5 | 5 | 5 | 10 | 0 | 5 | 5 | 5 | 5 | 5 |
| Inboard middle sipe | | | | | | | | | | | | |
| number | 3 | 3 | 3 | 3 | 3 | 3 | 3 | 2 | 4 | 3 | 3 | 3 |
| Tie bar | | | | | | | | | | | | |
| length L10 (mm) | 10.4 | 10.4 | 10.4 | 10.4 | 10.4 | 10.4 | 10.4 | 10.4 | 10.4 | 10.4 | 5.2 | 15.6 |
| height H10 (mm) | 3.4 | 3.4 | 3.4 | 3.4 | 3.4 | 3.4 | 3.4 | 3.4 | 3.4 | 3.4 | 1.7 | 5.1 |
| H10/D7c (%) | 47 | 47 | 47 | 47 | 47 | 47 | 47 | 47 | 47 | 47 | 24 | 71 |
| Wear resistance | 100 | 95 | 108 | 102 | 110 | 110 | 107 | 108 | 106 | 104 | 106 | 109 |
| Snow performance | 100 | 100 | 100 | 100 | 100 | 99 | 102 | 100 | 100 | 101 | 100 | 98 |
| Ice performance | 100 | 100 | 100 | 100 | 98 | 98 | 103 | 99 | 105 | 100 | 100 | 100 |

The invention claimed is:

1. A pneumatic tire comprising a tread portion provided with a pair of shoulder circumferential grooves disposed one on each side of the tire equator, and a crown circumferential groove disposed on each side of the tire equator and between the shoulder circumferential grooves, so as to form a pair of middle land zones each between the crown circumferential groove and one of the shoulder circumferential grooves, and a pair of shoulder land zones each formed between one of the shoulder circumferential grooves and the adjacent tread edge, wherein
the shoulder land zones are each provided with shoulder lateral grooves arranged at variable pitches in the tire circumferential direction and extending to the tread edge at an angle of not more than 30 degrees with respect to the tire axial direction so that domains defined between the shoulder lateral grooves include a smallest domain having the smallest circumferential length and a largest domain having the largest circumferential length,
each of the shoulder land zones is provided between every two of the circumferentially adjacent shoulder lateral grooves with at least one shoulder sipe extending at an angle of not more than 30 degrees with respect to the tire axial direction toward the tread edge but ending without reaching to the tread edge, and
the number of the shoulder sipe or sipes provided in the smallest domain is less than the number of the shoulder sipes provided in the largest domain, wherein
in an inboard half of the tread portion on one side of the tire equator,
the shoulder lateral grooves extend from the shoulder circumferential groove to the tread edge,
the shoulder lateral grooves are each provided with a tie bar protruding from the groove bottom and formed close to the shoulder circumferential groove,
said at least one shoulder sipe extends to the shoulder circumferential groove,
the middle land zone is provided with middle lateral grooves extending across the entire axial width of the middle land zone and inclining at an angle of from 20 to 60 degrees with respect to the tire axial direction toward one circumferential direction, and
the middle land zone is provided between every two of the circumferentially adjacent middle lateral grooves with two to four middle sipes inclining at an angle of from 30 to 70 degrees with respect to the tire axial direction toward the opposite circumferential direction to that of the middle lateral grooves, and wherein
in an outboard half of the tread portion on one side of the tire equator,
the shoulder lateral grooves each extend from its axially inner end located at a position apart from the shoulder circumferential groove to the tread edge to have an axially inner end face which is a downslope extending to the bottom of the shoulder lateral groove and to have a substantially constant depth from the axially inner end face toward the tread edge,
said at least one shoulder sipe does not extend to the shoulder circumferential groove, and
the middle land zone is not provided with said middle lateral grooves and said middle sipes.

2. The pneumatic tire according to claim 1, wherein the axial distance from the tread edge to the end of the shoulder sipe is not more than 5 mm.

3. The pneumatic tire according to claim 1, wherein the crown circumferential grooves and the shoulder circumferential grooves extend straight in the tire circumferential direction.

4. The pneumatic tire according to claim 1, wherein in the outboard half of the tread portion, the middle land zone is provided with
a middle sub groove extending continuously in the tire circumferential direction,
inner middle sipes extending from the middle sub groove to the crown circumferential groove, and
outer middle sipes extending from the middle sub groove to the shoulder circumferential groove, and
the number of the inner middle sipes is more than the number of the outer middle sipes.

5. The pneumatic tire according to claim 4, wherein a center land zone defined between the crown circumferential grooves is provided with a center sub groove extending continuously in the tire circumferential direction, and center sipes extending from the center sub groove to the crown circumferential grooves.

6. The pneumatic tire of claim 5, wherein the center sub groove has a groove width of from 3 to 7% of the maximum width of the center land zone and a groove depth of from 1.5 to 3.5 mm.

7. The pneumatic tire of claim 1, wherein the crown circumferential grooves are defined by an outboard crown circumferential groove and an inboard crown circumferential groove, wherein the outboard crown circumferential groove is disposed closer to the tire equator than the inboard crown circumferential groove, creating an asymmetrical groove arrangement.

8. The pneumatic tire of claim 7, wherein the groove width of the outboard crown circumferential groove is larger than the groove width of the inboard crown circumferential groove.

\* \* \* \* \*